(No Model.)
C. VOGEL.
SPEED GEAR FOR VELOCIPEDES.
No. 503,919. Patented Aug. 22, 1893.
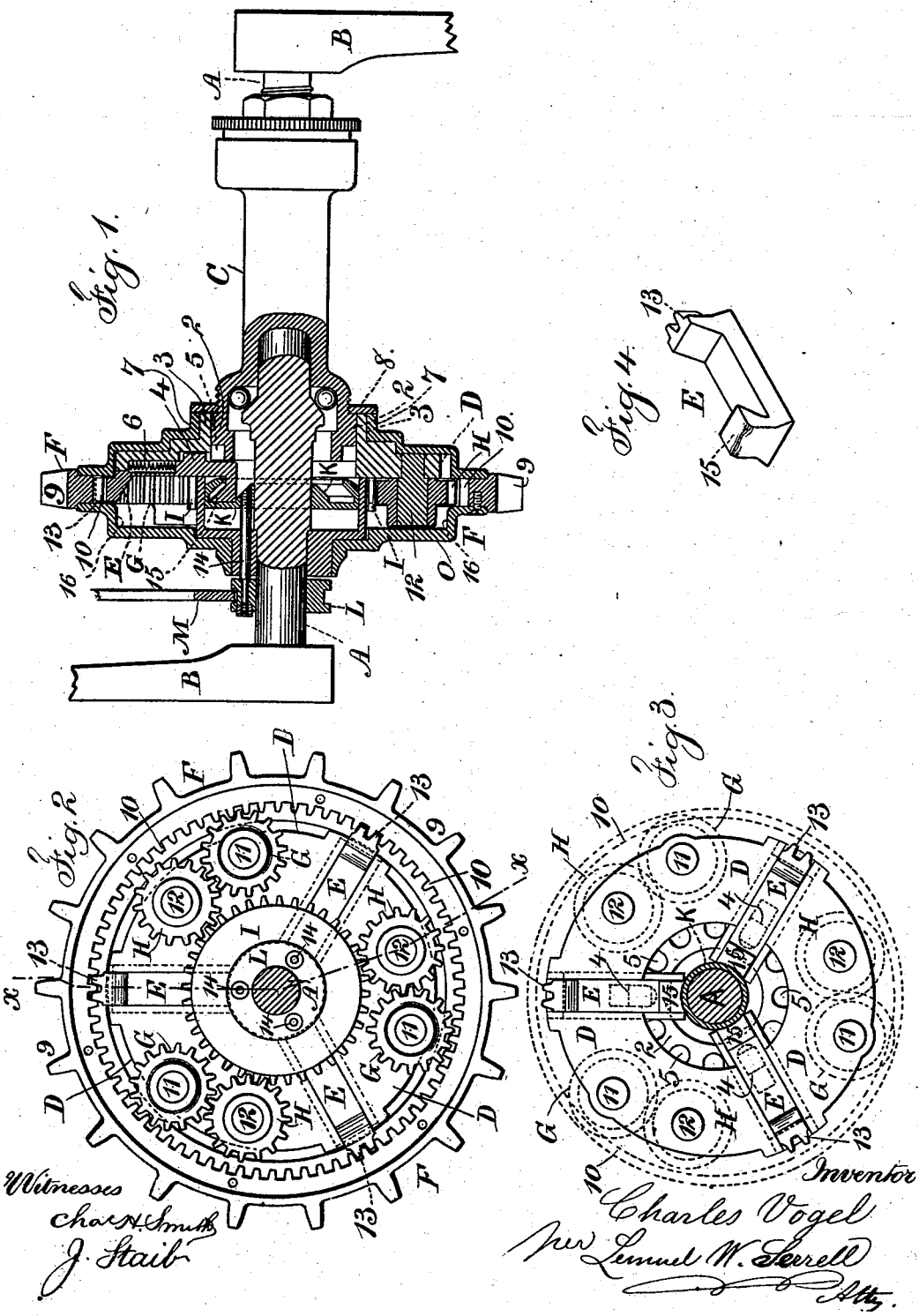
Witnesses
Chas. H. Smith
J. Staib
Inventor
Charles Vogel
per Lemuel W. Serrell
Atty.

UNITED STATES PATENT OFFICE.

CHARLES VOGEL, OF FORT LEE, NEW JERSEY.

SPEED-GEAR FOR VELOCIPEDES.

SPECIFICATION forming part of Letters Patent No. 503,919, dated August 22, 1893.

Application filed February 18, 1893. Serial No. 462,854. (No model.)

*To all whom it may concern:*

Be it known that I, CHARLES VOGEL, a citizen of the United States, residing at Fort Lee, in the county of Bergen and State of New Jersey, have invented an Improvement in Speed-Gears for Velocipedes, of which the following is a specification.

In Letters Patent No. 479,177, granted to me July 19, 1892, a speed gear for velocipedes is represented in which the treadles can be rotated in one direction and the chain wheel receives a corresponding movement, and when rotated in the other direction the chain wheel receives a slower movement than the pedals, so as to increase the leverage and lessen the speed. In this apparatus difficulty has been experienced in controlling the speed by the treadles when the velocipede is running down hill.

In my present invention I make use of sun and planet wheels for changing the leverage, and a clutch for disconnecting such speed gearing from the treadles and connecting such treadles directly with the chain wheel, so that the treadles are preferably moved in the same direction whether one speed or the other is made use of, and such treadles are positively connected so that they can be used in controlling the movement of the machine when on a downward grade.

In the drawings, Figure 1 is a section longitudinally of the chain wheel shaft at the line $x$, $x$, Fig. 2. Fig. 2 is an elevation with the cap removed, and Fig. 3 is a separate diagram representing the clutches and the head carrying the same. Fig. 4 is a perspective view of one of the clutch slides.

The shaft A receives upon its opposite ends the crank arms B for the treadles or pedals of any desired character, upon which the feet act as usual, and C is the stationary cylinder or bearing which is permanently connected with the frame of the velocipede and through which cylinder the shaft A passes, and there are ball bearings or other suitable anti-friction appliances to lessen the friction of the shaft A within the cylinder C.

At one end of the cylinder or bearing C is a cylindrical bearing 2 for the hub 3 of the carrier plate D which is circular and receives the arbors of the pinions hereinafter mentioned, and in this carrier plate D are clutch slides E having studs 4 that engage the notches 5 in the cylindrical bearing 2 when these clutch slides E are moved inwardly, and there are springs 6 that tend to move such clutch slides inwardly when not otherwise acted upon, and in such case the studs 4 engaging the notches 5 permanently connect the carrier plate D to the stationary bearing C, but when such clutch slides are pressed outwardly the studs 4 are liberated from the notches 5 and the carrier plate is free to be revolved upon the cylindrical bearing 2 of the stationary cylinder C.

The chain wheel F has an eye 7 surrounding the hub 3 of the carrier plate and the collar 8 serves to exclude dust from the parts, and this chain wheel F has the projections 9 for engaging the chain. These parts may be of any desired character, and around within the rim of the chain wheel there are gear teeth 10 which engage the pinions G that are upon the studs 11 that project from the carrier plate D, and there are preferably intermediate pinions H on the studs 12 gearing into the pinions G, and the pinions H gear into the wheel I that is permanently attached to the shaft A. On the outer ends of the clutch slides E are teeth 13 that engage the teeth of the internal gear 10 when such clutch slides are projected, or when the clutch slides are retracted the teeth 13 are free from the internal gear 10. Around the shaft A and within the gear I is the conical clutch K that is connected by the rods 14 that pass through the hub of the gear I and attached to the grooved collar L, so that the conical clutch K can be moved along upon the shaft A by this grooved collar L, and there is a forked lever M or other suitable device under the control of the rider by which the grooved collar L can be moved in one direction or the other or with it the conical clutch K. The conical clutch K acts upon the claws 15 at the inner end of the clutch slides E, and when the conical clutch K is pressed between the claws 15 the clutch slides E are thrown outwardly and the teeth 13 of such clutch slides engage the teeth 10 of the internal gear, and there is a cylindrical portion upon the conical clutch adjacent to the conical portion thereof, which coming between the claws 15 of the slides E hold them reliably in their projected condition; and it is now to be understood that when these clutch slides are projected and their teeth engage the teeth of the internal gear 10, the studs 4 are outside of the notches in the hub or cylindrical bearing 2 as shown in Fig. 1, and hence the carrier plate D is free to revolve around such cylindrical bearing 2, and as the shaft A is revolved by the cranks, the gears all remain in a fixed position, because the carrier plate D is permanently connected with the chain wheel through the teeth of the clutch slides and the chain wheel is revolved at the same speed as the cranks, and it may be revolved in either one direction or the other. When the forked lever M is moved in the other direction and the clutch slides E and their studs 4 engage the notches 5 in the cylindrical bearing 2, as shown in Fig. 3, the carrier plate D remains stationary in consequence of being firmly connected to the cylinder C, and the internal gear and chain wheel are disconnected from the clutch slides E in consequence of the said clutch slides being drawn inwardly and the teeth 13 being disconnected from the gear 10. In this position the shaft A and gear I are rotated and motion is communicated through the pinions G and H to the internal gear 10 and chain wheel, and in consequence of the gear I being smaller than the internal gear teeth 10, the chain wheel is revolved slower than the crank shaft and with a proportionate increase of power, and the chain wheel is entirely under the control of the cranks and pedals and may be rotated in either direction. It will be apparent that in consequence of using the pinions G H in pairs the cranks are rotated in the same direction when going forward by a positive connection to the chain wheel or when intermediately geared for the slower speed and greater power, but if only one set of pinions G is made use of, the teeth of which engage the teeth 10 of the internal gear and also the teeth of the gear I, then the direction of the crank will be reversed when the gears are in use from the direction of the crank when connected directly to the chain. The cap plate O serves to hold the intermediate gears in position, and by providing an annular offset 16 against which the tubular hubs of the gears G bear, the friction of the parts is lessened and the carrier plate and chain wheel are kept concentric.

I claim as my invention—

1. The combination with the stationary cylindrical bearing C. the crank arms and shaft A. of the chain wheel and its internal gear, the carrier plate within the chain wheel, a gear upon the crank shaft and intermediate gears between the said gear and the internal gear, the studs of which intermediate gears are upon the carrier plate, radial clutch slides and teeth thereon for connecting the carrier plate with the internal gear and chain wheel and lugs for engaging the cylindrical bearing, and means for moving the clutch slides inwardly or outwardly substantially as set forth.

2. The carrier plate D and the radial clutch slides therein provided with teeth 13 and studs 4, in combination with the chain wheel and internal gear, the stationary cylindrical bearing 2 with the notches 5, the conical clutch K, grooved collar and connecting rods, and mechanism for actuating the same, the gear wheel I upon the crank shaft and the intermediate gears upon the carrier plate, substantially as set forth.

3. The carrier plate D and the radial clutch slides therein provided with teeth 13 and studs 4, in combination with the chain wheel and internal gear, the stationary cylindrical bearing 2 with the notches 5, the conical clutch K, grooved collar and connecting rods, and mechanism for actuating the same, the gear wheel I upon the crank shaft and the intermediate gears in pairs upon the carrier plate, whereby the crank shaft is rotated in the same direction for propelling the velocipede whether the speed gears are in use or not, substantially as set forth.

Signed by me this 16th day of February, 1893.

CHARLES VOGEL.

Witnesses:
  GEO. T. PINCKNEY,
  A. M. OLIVER.